United States Patent [19]

Grenga

[11] Patent Number: 5,695,225
[45] Date of Patent: Dec. 9, 1997

[54] REUSABLE UNION COUPLING

[75] Inventor: Stephen G. Grenga, Newark, N.Y.

[73] Assignee: Spinco Metal Products, Inc., Newark, N.Y.

[21] Appl. No.: 559,675

[22] Filed: Nov. 20, 1995

Related U.S. Application Data

[63] Continuation-in-part of Ser. No. 436,782, May 8, 1995, Pat. No. 5,564,754.

[51] Int. Cl.[6] ................................................. F16L 19/00
[52] U.S. Cl. .............................. 285/150; 285/354; 62/525
[58] Field of Search .............................. 62/525; 285/150, 285/354

[56] References Cited

U.S. PATENT DOCUMENTS

| | | | |
|---|---|---|---|
| D. 341,409 | 11/1993 | Wiser | D23/233 |
| 3,120,743 | 2/1964 | Wilson | 62/504 |
| 3,563,055 | 2/1971 | Owens | 62/525 |
| 3,745,787 | 7/1973 | Ponziani | 62/504 |
| 3,877,248 | 4/1975 | Honnold, Jr. | 62/511 |
| 3,992,898 | 11/1976 | Dufu et al. | 62/324 |
| 4,643,222 | 2/1987 | Wiser | 137/528 |
| 4,674,673 | 6/1987 | Parrish | 228/174 |
| 5,131,695 | 7/1992 | Wiser | 285/354 |
| 5,564,754 | 10/1996 | Grenga | 285/150 |

*Primary Examiner*—Eric K. Nicholson
*Attorney, Agent, or Firm*—Howard J. Greenwald

[57] ABSTRACT

A connector assembly with an integral connector body of a specified size and shape. The connector body has a substantially hexagonal upper section connected to a first, unthreaded cylindrical section, which in turn is connected to a second threaded cylindrical section, which in turn is connected to a third unthreaded cylindrical section with substantially the same diameter, which in turn is connected is connected to a bottom, undercut, unthreaded section. The assembly also contains an adaptor having a central channel and an external annular sealing groove, a washer disposed within a seal cavity for forming a sealed connection when the body and adaptor are engaged, and a collar for movably connecting the connector body to the adaptor and selectively positioning the external sealing groove with respect to the internal sealing groove.

9 Claims, 8 Drawing Sheets

REUSABLE UNION COUPLING

CROSS-REFERENCE TO RELATED PATENT APPLICATION

This application is a continuation-in-part of applicant's patent U.S. patent application Ser. No. 08/436,782, filed on May 8, 1995, now U.S. Pat. No. 5,564,754.

FIELD OF THE INVENTION

A leakproof union coupling for use in connecting conduits used in refrigeration systems.

BACKGROUND OF THE INVENTION

Herman D. Wiser's U.S. Pat. No. 5,131,695, which is assigned to Chatleff Controls, Inc. of Buda, Tex., discloses and claims a connector assembly which contains (a) a connector body with a first end and a second end having a central channel and an internal annular sealing groove, said adaptor and external sealing groove being dimensioned relative to the connector body and internal sealing groove such that a portion of the adaptor and external groove are received within the central channel of the connector body, and the internal groove and the external groove mate to form a variable washer seal cavity, (b) a washer disposed within the variable seal cavity for forming a sealed connection when the body and adaptor are engaged, the adaptor having an annular stop surface thereon, said stop surface positioned such that it contacts a portion of the connector body after the washer has exceeded its maximum intended compression, and (c) means for movably connecting the connector body to the adaptor and selectively positioning the external sealing groove with respect to the internal sealing groove to thereby vary the compression of the washer within the variable seal cavity. The disclosure of this patent is hereby incorporated by reference into this specification.

U.S. Pat. No. 5,131,695 was reexamined, and reexamined patent B1 5,131,695 was issued on Jan. 18, 1994. The reexamined patent claimed a connector assembly similar to that claimed in U.S. Pat. No. 5,131,695 and additionally containing a generally cylindrical collar having internal threads adapted for engaging a threaded outer surface of the body, said collar also having an inwardly extending annular flange ring engaging a flange extending radially outward from the adaptor.

The reusable union coupling disclosed in U.S. Pat. Nos. 5,131,695 and B1 5,131,695 is being sold by Chatleff Controls, Inc. of Buda, Tex. This coupling is frequently used in refrigeration systems.

As is discussed in column 1 of U.S. Pat. No. 5,131,695, "Refrigeration systems may typically include several components, such as compressors, condensers, heat exchangers, and valves, which must be connected together in a way that effectively seals the interior of the refrigerant circulating system from the environment around it. Refrigerants, such as freon, which are introduced into such systems as the working fluid, are expensive, hazardous to the environment, and sometimes toxic . . . "

The Chatleff coupling, however, presents a problem: during its installation, it sometimes is damaged so that it ceases to function in its intended manner.

As is illustrated in design patent Des. 341,409, which is also assigned to Chatleff Controls, Inc, which depicts the Chatleff coupling, and which is hereby incorporated by reference into this specification, the Chatleff coupling is adapted to be used with a multiplicity of copper circuit tubes which are joined to the top of the coupling. These copper circuit tubes are conventionally attached to the top of the coupling by a silver brazing process in which temperatures in excess of 1,200 degrees Fahrenheit are often applied to the coupling body. This heat treatment affects the physical properties of the coupling body, effectively annealing it.

After the copper circuit tubes are joined to the coupling body, the coupling body is then joined to another device (such as, e.g., a condenser evaporator coil) by applying torque to it, typically with a wrench. Depending upon the size, strength, and energy of the person attaching the coupling, and the length of the wrench used, the amount of torque applied will vary within wide limits. Although the coupling body is designed to be torqued within specified given limits, these limits are often exceeded, especially when the person installing the fitting does not have a torque wrench readily accessible.

Disposed within the coupling body is a central passageway (see, e.g., channel 16 of U.S. Pat. No. 5,131,695) in which a movable piston is frequently disposed. Typically, the outside diameter of the piston is only from about 0.001 to about 0.003 inches smaller than the diameter of the channel. Thus, it does not require much distortion of the walls of the coupling body to cause such walls to impinge upon and affect the function of the movable piston.

Damage to the movable piston often will not be discovered until the coupling has been installed and the refrigeration system has been charged with "expensive", "hazardous", and/or "toxic" refrigerant fluid.

When concealed damage to the movable piston is discovered after installation of the coupling, it often requires a substantial amount of time and expense to remedy the problem. The are a substantial number of state and federal regulations governing the repair of devices containing refrigerants such as chlorofluorocarbons, hydrochlorofluorocarbons, and other regulated refrigerant materials. A licensed technician must evacuate the refrigeration system, remove the coupling, repair or replace the coupling and/or the movable piston within it, reconnect the coupling, charge the system with fresh refrigerant, dispose of the used refrigerant, and fill out whatever forms are necessary. It is desirable to avoid this tedious, time consuming, expensive process.

It is an object of this invention to provide a reusable union coupling which is substantially less likely than the coupling of U.S. Pat. No. 5,131,695 to be damaged during its installation.

SUMMARY OF THE INVENTION

In accordance with this invention, there is provided a connector assembly which is comprised of a connector body with a specified shape and size. The connector body has a first end and second end and a a central channel and an internal annular sealing groove, said adaptor and external sealing groove being dimensioned relative to the connector body and internal sealing groove such that a portion of the adaptor and external groove are received within the central channel of the connector body, and the internal groove and the external groove mate to form a washer seal cavity. A washer is disposed within the seal cavity for forming a sealed connection when the body and adaptor are engaged, the adaptor having an annular stop surface thereon.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
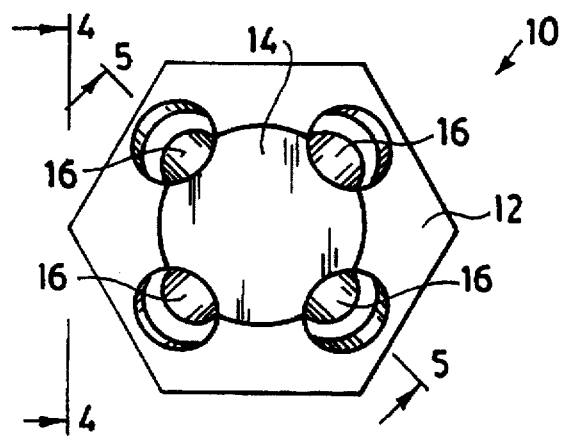
FIG. 1 is a top view of one preferred distributor valve body of this invention.

The coupling of this invention is adapted to distribute refrigerant fluid (such as refrigerant chlorofluorocarbons, hydrochlorofluorocarbons, and/or other regulated refrigerant gases or liquids) in several different directions. It is often referred to as a "Bi-Flow Distributor" and is discussed, e.g., on pages 2–3 of the "Brass Products Division" of Spinco Metal Products, Inc., One Country Club Drive, Newark, N.Y. 14513.

Bi-directional flow valves are well known to those skilled in the art and are described, e.g., in U.S. Pat. Nos. 5,364,070, 5,345,780, 5,174,544, and the like. The disclosure of each of these United States patents is hereby incorporated by reference into this specification.

The bi-directional flow valve of this invention, however, is especially suitable for use in refrigeration systems. This Bi-Flow device is a reusable coupling which is identical or similar in many respects to the reusable coupling disclosed and claimed in U.S. Pat. Nos. 5,131,695 and B1 5,131,695, the entire disclosures of which are hereby incorporated by reference into this specification; thus, the configuration of its collar, its inwardly-extending annular flange ring of the collar, its internal threads of the collar, its connector body, its connector body sealing groove, its stop surface of the connector body, its external threads of the connector body, its adaptor, its adaptor sealing groove, its stop surface of the adaptor, and its outwardly-extending flange of the adaptor are identical to or similar to the configurations of these elements disclosed in U.S. Pat. Nos. 5,131,695 and B1 5,131,695.

However, the reusable coupling of this invention differs from the coupling of U.S. Pat. No. 5,131,695 and B1 5,131,695 in at least two major respects: the use of a connector body with a different geometry than the connector body of such patents, and the use of relatively "soft" washer which, under normal operating conditions, allows metal-to-metal contact between the stop surface of the body and the adaptor when less than about fifty percent of the washer's width has been compressed.

The geometry of the Chatleff coupling was discussed during the prosecution of Chatleff's design patent Des.341, 409, the disclosure of which (and the file history of which) are incorporated by reference into this specification. In an Apr. 14, 1993 "RESPONSE" filed in Design patent application 07/602,198, Chatleff stated that the design of their coupling included ". . . two cylindrical portions having different diameters (C and D in Exhibit 1) below the hexagonal portion (B) . . . "; such ". . . two cylindrical portions having different diameters . . . " is not present in the coupling of the instant application, which contains one cylindrical portion of substantially constant diameter below its top hexagonal portion.

In the same Apr. 14, 1993 "RESPONSE", Chatleff also stated that their coupling was distinguished by ". . . the presence of a cylindrical (not hexagonal) portion at the upper part of the distributor body . . . ," by having a ". . . cylindrical portion between the hexagonal portion and the top of the body . . . "; in applicant's claimed structure, by comparison, there is a hexagonal (not cylindrical) portion at the upper part of the distributor body.

The modifications applicant has made to the geometry of the Chatleff coupling body have made such body substantially more resistant to being damaged by the application of a torquing force. These modifications are discussed in more detail below.

FIG. 1 is a top view of a preferred distributor valve body 10. Referring to FIG. 1, it will be seen that valve body 10 is comprised of a top portion containing a beveled edge 12 and a substantially flat top 14.

The top portion of valve body 10 can have other shapes. Thus, e.g., in one embodiment, not shown, it is substantially arcuate.

In the preferred embodiment illustrated in FIG. 1, the top portion of distributor valve body 10 has a substantially hexagonal shape. Other shapes which can readily be grasped by a wrench also may be used. Thus, in one embodiment, not shown, the top portion of distributor valve body 10 has a substantially square shape. In another embodiment, not shown, the top portion of distributor valve body 10 has a substantially octagonal shape.

Figure 6:
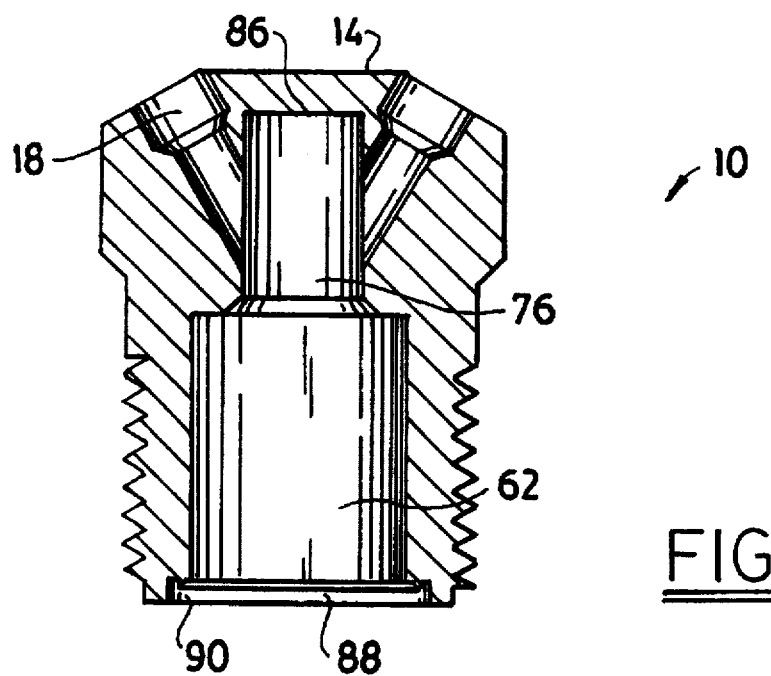
FIG. 6 is a sectional view of yet another preferred distributor valve body.

Referring again to FIG. 1, it will be seen that the top 14 of valve body 10 and/or the beveled egde 12 of valve body 10 contains circuit holes 16 which, after brazing, communicate with copper tubes (not shown in FIG. 1, but see FIG. 6). In the embodiment illustrated in FIG. 1, there are four circuit holes 16 which can be joined to four copper tubes. In general, from about 2 to about 10 circuit holes 16 can exist on top of body 10, it being preferred that there be either 2, 3, 4, or 6 of such circuit holes 16.

Figure 5:
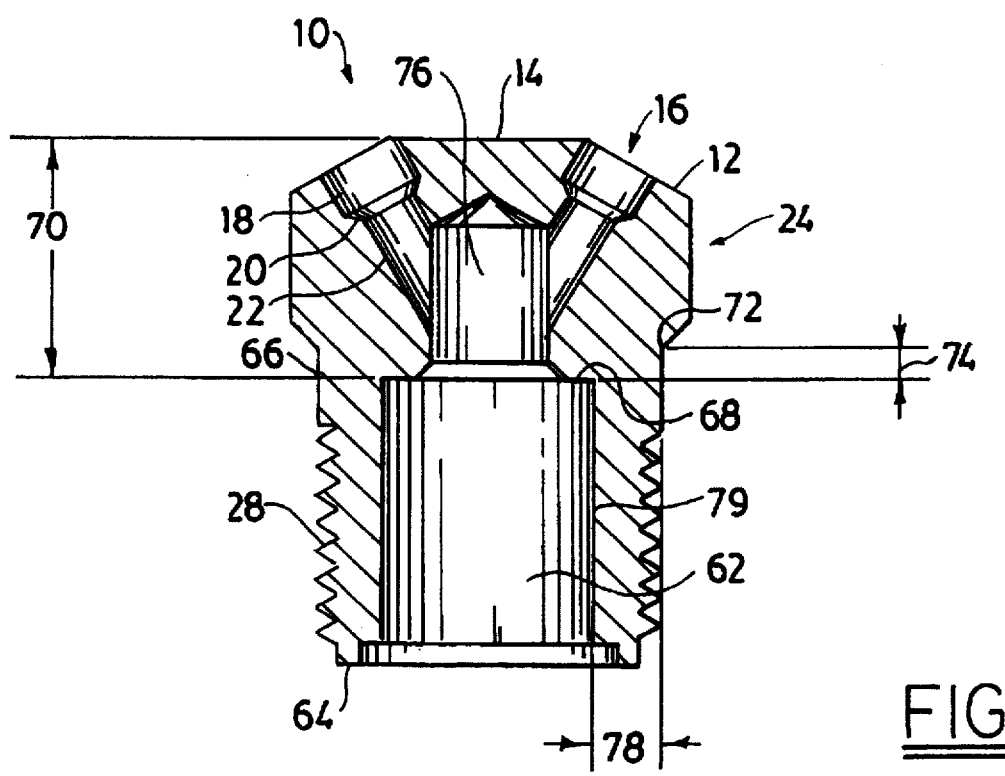
FIG. 5 is a sectional view of the distributor valve body of FIG. 1.
Figure 10:
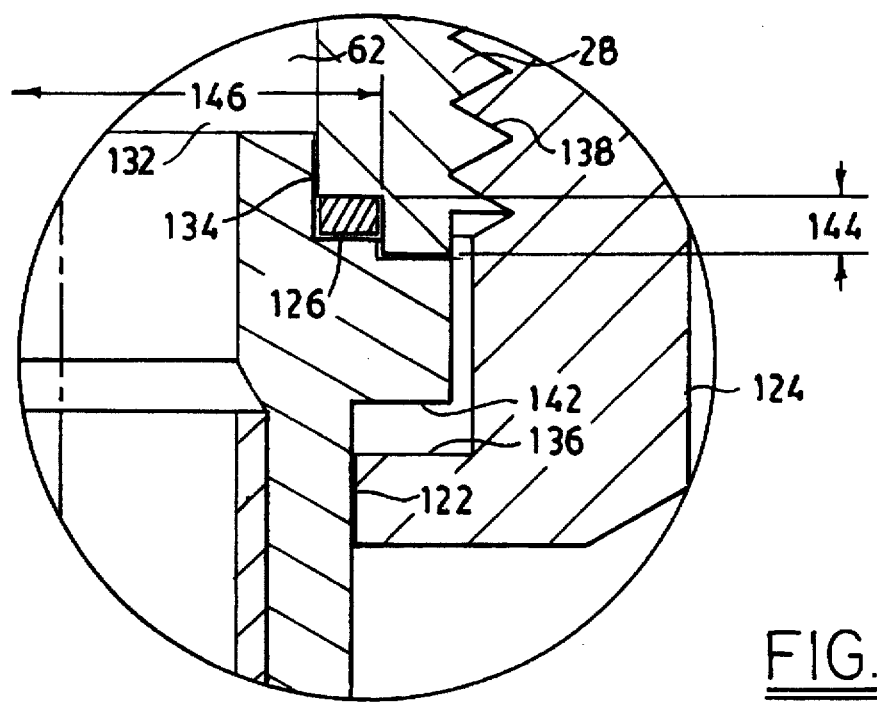
FIG. 10 is an enlarged sectional view of one portion of the valve of FIG. 9.

FIG. 5 is a sectional view of the valve body 10 of FIG. 10 illustrating preferred circuit holes 16 in more detail. Referring to FIG. 5, it will be seen that each of circuit holes 16 preferably has a stepped bore arrangement and is comprised of first stepped bore 18, tube stop 20, and second stepped bore 22.

In one preferred embodiment, not shown, each of circuit holes 16 is comprised of a first stepped bore, a transition section, a second stepped bore, a transition section, and a third stepped bore.

As will be apparent to those skilled in the art, and referring to FIG. 5, the copper tubes (not shown in FIG. 5) inserted into circuit holes 16 will contact tube stop 20 when pushed into such holes.

It is preferred that bore 18 have an inner diameter of from about 0.06 to about 0.3 inches, that bore 22 have an inner diameter of from about 0.05 to about 0.24 inches, and that the diameter of bore 18 exceed the diameter of bore 22 by at least about 0.01 inches. In one embodiment, bore 18 has a diameter of 0.25 inches, and bore 22 has a diameter of 0.19 inches. In another embodiment, bore 18 has a diameter of 0.19 inches, and bore 22 has a diameter of 0.13 inches.

In one embodiment, not shown, the top edges of circuit holes 16 are chamfered.

Figure 2:
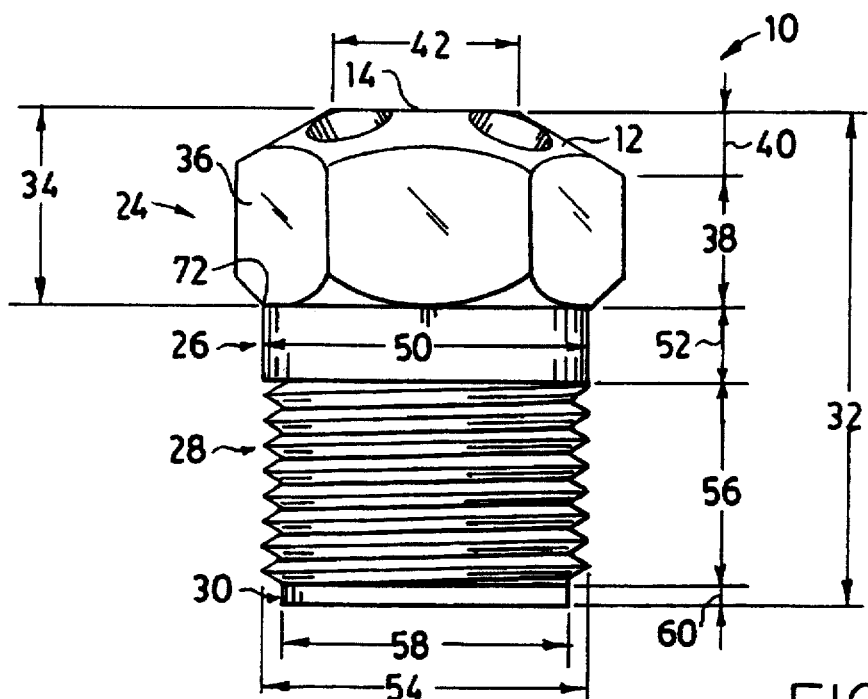
FIG. 2 is a front view of the distributor valve body of FIG. 1.

FIG. 2 is a front view of the valve body 10. Without wishing to be bound to any particular theory, applicant believes that the dimensions and shape of body 10 contribute towards the increased durability of a distributor flow valve in which it is incorporated.

Referring to FIG. 2, it will be seen that body 10 is preferably an integral assembly comprised of a top substantially hexagonal portion 24, a first intermediate cylindrical portion 26, a second intermediate threaded portion 28, and a bottom non-threaded portion 30.

In the preferred embodiment depicted in FIG. 2, body 10 has an overall length 32 of from about 1.0 to about 1.4 inches. In an even more preferred embodiment, the length 32 of body 10 is from about 1.1 to about 1.2 inches, an especially preferred length 32 being from about 1.15 to about 1.19 inches.

Referring again to FIG. 2, it will be seen that the overall length 34 of the substantially hexagonal portion 24 is preferably at least about 0.30 inches, and more preferably at least about 0.37 inches. The hexagonal part 36 of portion 24 has a length 38 of from about 0.25 to about 0.5 inches. In one preferred embodiment the length 38 is from about 0.3 to about 0.4 inches, a length 38 of about 0.312 inches being especially preferred.

The chamfered part 12 of portion 34 has a length 40 of less than about 0.25 inches and, preferably, less than 0.2 inches. In one preferred embodiment, length 40 is less than about 0.1 inches. In another embodiment, length 40 is about 0.08 inches.

Referring again to FIG. 2, it will be seen that the chamfered part 12 of portion 24 preferably forms an angle of from about 10 to about 40 degrees. The top 14 of body 10 preferably is substantially flat and preferably has a width 42 of from about 0.1 to about 0.7 inches, more preferably from about 0.37 to about 0.63 inches and, even more preferably, from about 0.4 to about 0.5 inches. In one embodiment, width 42 is about 0.45 inches.

The ratio of the length 38 of the hexagonal part 36 to overall length 32 of the body 10 is at least 0.15 and, preferably, is at least about 0.2.

Figure 3:
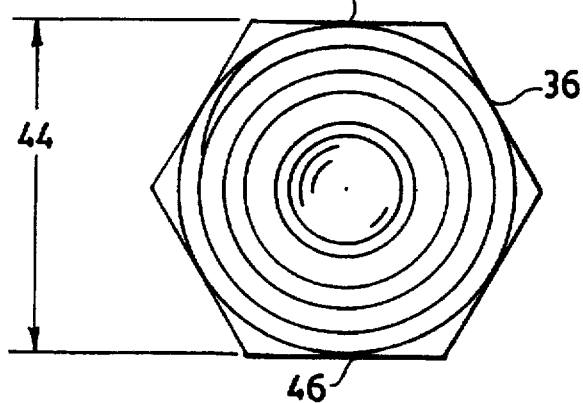
FIG. 3 is a bottom view of the distributor valve body of FIG. 1.
Figure 4:
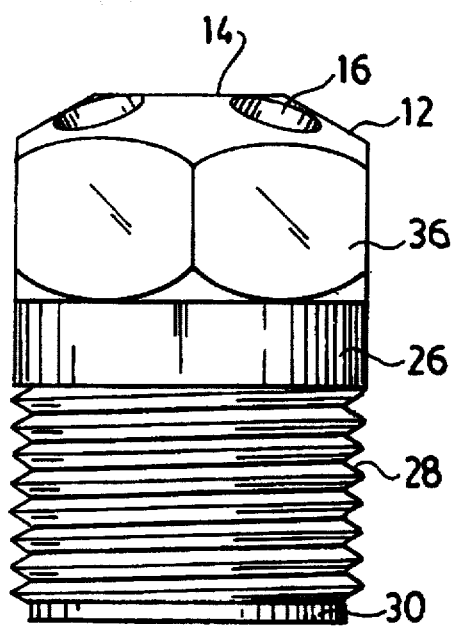
FIG. 4 is a back view of the distributor valve body of FIG. 1.

Referring to FIG. 3, it will be seen that the hexagonal part 36 of portion 24 (see FIG. 2) has a width 44 (as measured from flat part 46 to opposing parallel flat part 48) of from about 0.6 to about 1.3 inches and, more preferably, from about 0.75 to about 1.125 inches. In one preferred embodiment, width 44 is from about 0.75 to about 0.85 inches.

Referring again to FIG. 2, the first intermediate cylindrical portion 26 of body 10 preferably has a width 50 of from about 0.62 to about 1.3 inches and, more preferably, from about 0.73 to about 1.125 inches and, even more preferably, from about 0.74 to about 0.84 inches. It is preferred that width 44 exceed width 50 and that the ratio of width 44 to width 50 be from about 1.01 to about 1.36. In another embodiment, not shown, width 44 is substantially equal to width 50.

In the preferred embodiment illustrated in FIG. 2, the first intermediate portion 26 has a length 52 of from about 0.1 to about 0.4 inches, more preferably from about 0.18 to about 0.38 inches and even more preferably from about 0.25 to about 0.35 inches. In one embodiment, length 52 is about 0.3 inches.

Referring again to FIG. 2, and in the preferred embodiment depicted therein, the second intermediate threaded portion 28 preferably has a width 54 (as measured from outside thread to outside thread) which is substantially equal to width 50 of first intermediate portion 26. In another embodiment, not shown, width 54 is greater than width 50 by from about 0.01 to about 0.2 inches. In yet another embodiment, not shown, width 50 is greater than width 54 by from about 0.01 to about 0.3 inches.

Referring again to FIG. 2, it will be seen that the length 56 of portion 28 is preferably from about 0.25 to about 0.6 inches and, more preferably, from about 0.4 to about 0.6 inches; in one embodiment, length 56 is about 0.5 inches.

The bottom, non-threaded portion 30 of body 10, undercut 30, has a diameter 58 of from about 0.58 to about 1.22 inches and, more preferably, from 0.62 to about 0.70 inches; in one embodiment, diameter 58 is from about 0.0.65 to about 0.67 inches.

Referring again to FIG. 2, it will be seen that undercut portion 30 has a length 60 of less than about 0.08 inches and, more preferably, less than about 0.04 inches. In one embodiment, where length 60 is 0 inches, the undercut portion 30 is omitted.

It is preferred, however, to include the undercut portion 30. Without wishing to be bound to any particular theory, applicant believes that this particular configuration for undercut 30 allows body 10 to sustain a greater amount of torque than prior art devices before it becomes damaged.

Figure 12:
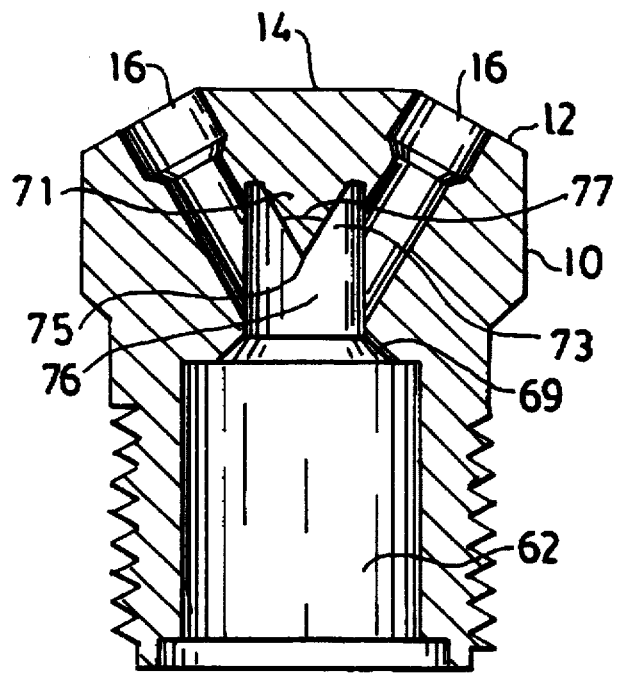
FIG. 12 is a sectional view of another preferred valve of the invention.

FIG. 5 is a sectional view of the body 10 of FIG. 1, illustrating that body 10 is comprised of a piston chamber 62. As is indicated in FIG. 12, during use the valve body 10 as a bi-flow distributor, a movable piston is preferably disposed within chamber 62.

Referring to FIG. 5, it will be seen that the piston chamber 62 extends from about the bottom 64 of body 10 to a point 66 intermediate the top 14 and the bottom 64 of body 10. The top 68 of piston chamber 62 is at a distance 70 from the top 14 of body 10 and is at least about 0.3 inches and, preferably, ranges from about 0.45 to about 0.8 inches. The distance 70 is at least about 35 percent of overall length 32 (see FIG. 2) and, preferably, is at least about 50 percent of overall length 32.

Referring again to FIG. 5, it will be seen that hexagonal portion 24 ends at point 72. The distance 74 between point 72 (where hexagonal portion 24 ends) and point 68 (where the top of chamber 62 ends) is at least about 0.03 inches and, more preferably, is at least about 0.1 inches; most preferably, distance 74 is at least about 0.12 inches.

Without wishing to be bound to any particular theory, applicant believes that the increased durability of applicant's assembly is not due only to the location of hexagonal portion 34 but also to the fact that the walls of body 10 are substantially thicker throughout its entire length than the walls of the prior art devices.

Referring to FIG. 5, and in the preferred embodiment depicted in this Figure, refrigerant (not shown) preferably flows through piston chamber 62 (and, more precisely, through a movable piston disposed within such chamber), and into transition chamber 76. Thereafter, the refrigerant flows from the transition chamber 76 through passageways 22, 20, and 18 and thence to copper circuit tubes (not shown in FIG. 5). As will be apparent to those skilled in the art, such refrigerant also may flow in the opposite direction.

Because, in the preferred embodiment depicted in FIG. 5, transition chamber 76 preferably has a substantially smaller inner diameter than piston chamber 62, the walls surrounding transition chamber 76 are substantially thicker than the walls surrounding piston chamber 62.

Referring again to FIG. 5, the minimum thickness 78 of the wall surrounding piston chamber 62 is at least about 0.13 inches. This minimum wall thickness 78 is preferably measured from the exterior wall 79 of piston chamber 62 and the major diameter of threaded portion 28 and/or the diameter of unthreaded portion 26, depending upon which is smaller.

Figure 5A:
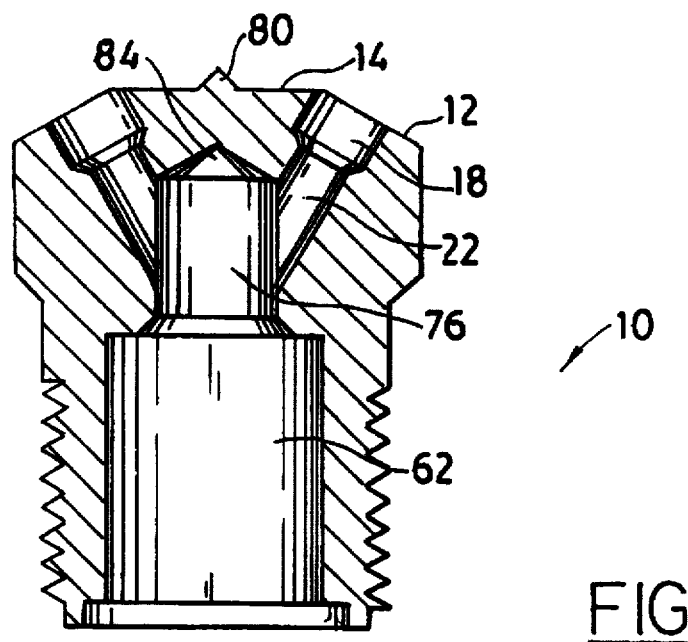
FIG. 5A is a sectional view of another preferred distributor valve body.

In one preferred embodiment, illustrated in FIG. 5A, a reverse cut off nib section 80 is included on the top of valve body 10. In the preferred embodiment illustrated in FIG. 5A, reverse cut off nib section 80 has a substantially triangular shape; however, a square or rectangular shaped section 80 also could be advantageously used.

It is preferred that section 80 have a height of from about 0.03 to about 0.09 inches and, more preferably, from about 0.05 to about 0.07 inches. The width of section 80 should preferably be from about 0.04 to about 0.20 inches and, more preferably, should be from about 0.1 to about 0.14 inches.

FIG. 6 is a sectional view of another preferred body 10 in which transition chamber 76, instead of terminating in a chamfered section 84 (see FIG. 5A), terminates in a substantially flat section 86.

Referring again to FIG. 6, it will be seen that washer cavity 88 is preferably comprised of a knife edge section 90. This section is shown in more detail in FIG. 7.

Figure 7:
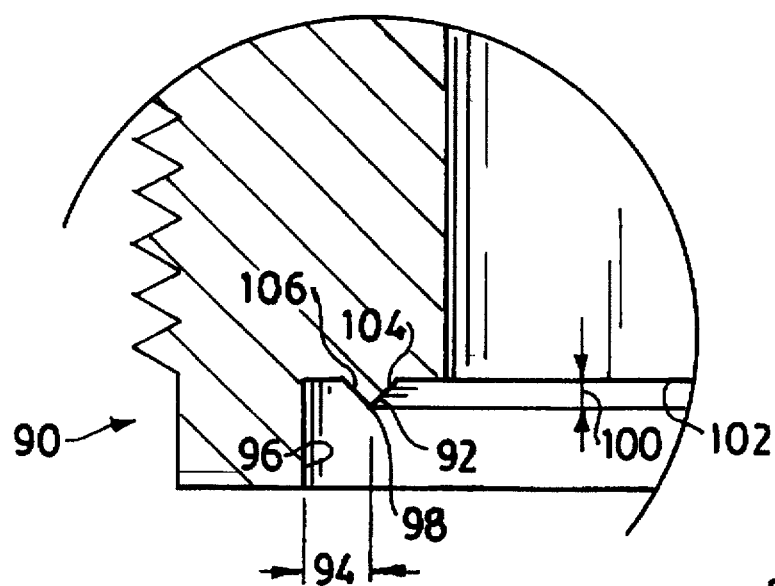
FIG. 7 is a partial, enlarged view of the knife edge portion of the valve body of FIG. 6.

FIG. 7 is a partial sectional view of knife edge section 90. Referring to FIG. 7, it will be seen that a knife surface 92 (which can bite into the washer, not shown) is disposed at a distance 94 of from about 0.015 to about 0.030 inches from the end 96 of the washer cavity. It is preferred that the apex 98 of knife point 92 be disposed at a distance 100 of from about 0.01 to about 0.03 inches (and more preferably about 0.010 inches) above the base 102 of the washer cavity and that the knife point be formed by walls 104 and 106 at angle of from about 60 to about 120 degrees. In one preferred embodiment, the angle is about 90 degrees.

Figure 8:
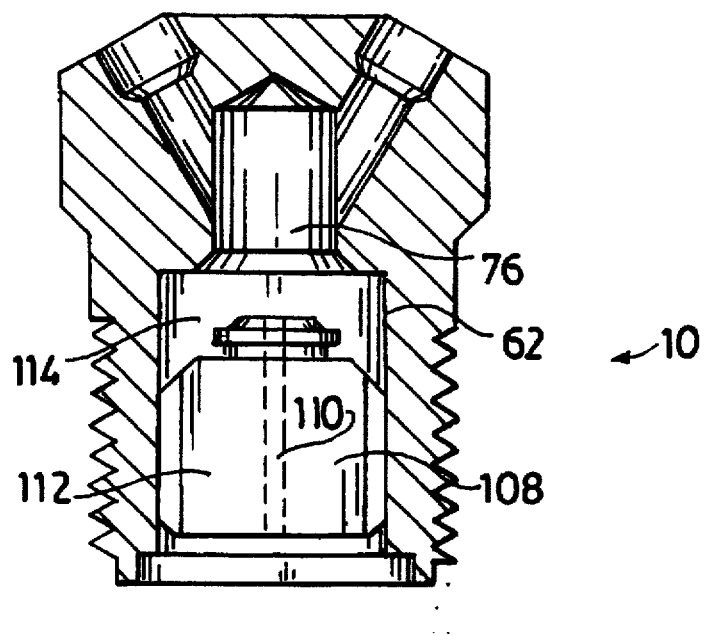
FIG. 8 is a sectional view of the valve assembly of FIG. 5 with a piston movably disposed within it.

FIG. 8 is a sectional view of a body 10, similar to that depicted in FIG. 5, in which a movable piston 108 is disposed within piston chamber 62. Referring to FIG. 8, it will be seen that movable piston 108 is comprised of a central orifice 110 extending through annular body 112 and washer or O-ring assembly 114, which preferably is made from a synthetic polymeric material such as, e.g., "Teflon".

Alternatively, or additionally, the O-ring assembly may comprise or consist essentially of an elastomeric material, such as neoprene.

Movable piston 108 is illustrative of the "orifice pistons" commonly used in the art; see, e.g., U.S. Pat. Nos. 4,685,545 and 4,206,726, the entire disclosure of each of which is hereby incorporated by reference into this specification.

Some of these orifice pistons are disclosed on page 4 of Spinco Brass Products Division 1995 catalog (Spinco Metal Products, Inc., One Country Club Drive, Newark, N.Y.). Referring to such catalog, it will be seen that, e.g., style 7PK5XXX is a 5 fluted piston with either a teflon or neoprene gasket, and style 3PKXXX is a 3 fluted piston.

The distributor valve body described above may be used as a component of a bi-flow distributor assembly. These assemblies strictly regulate flow in one direction, while allowing relatively free flow in another direction. Thus, e.g., when two of these units are installed back to back between a condenser and an evaporator, they provide performance and control in a heat pump unit. One preferred bi-flow distributor assembly is illustrated in FIG. 9.

Figure 9:
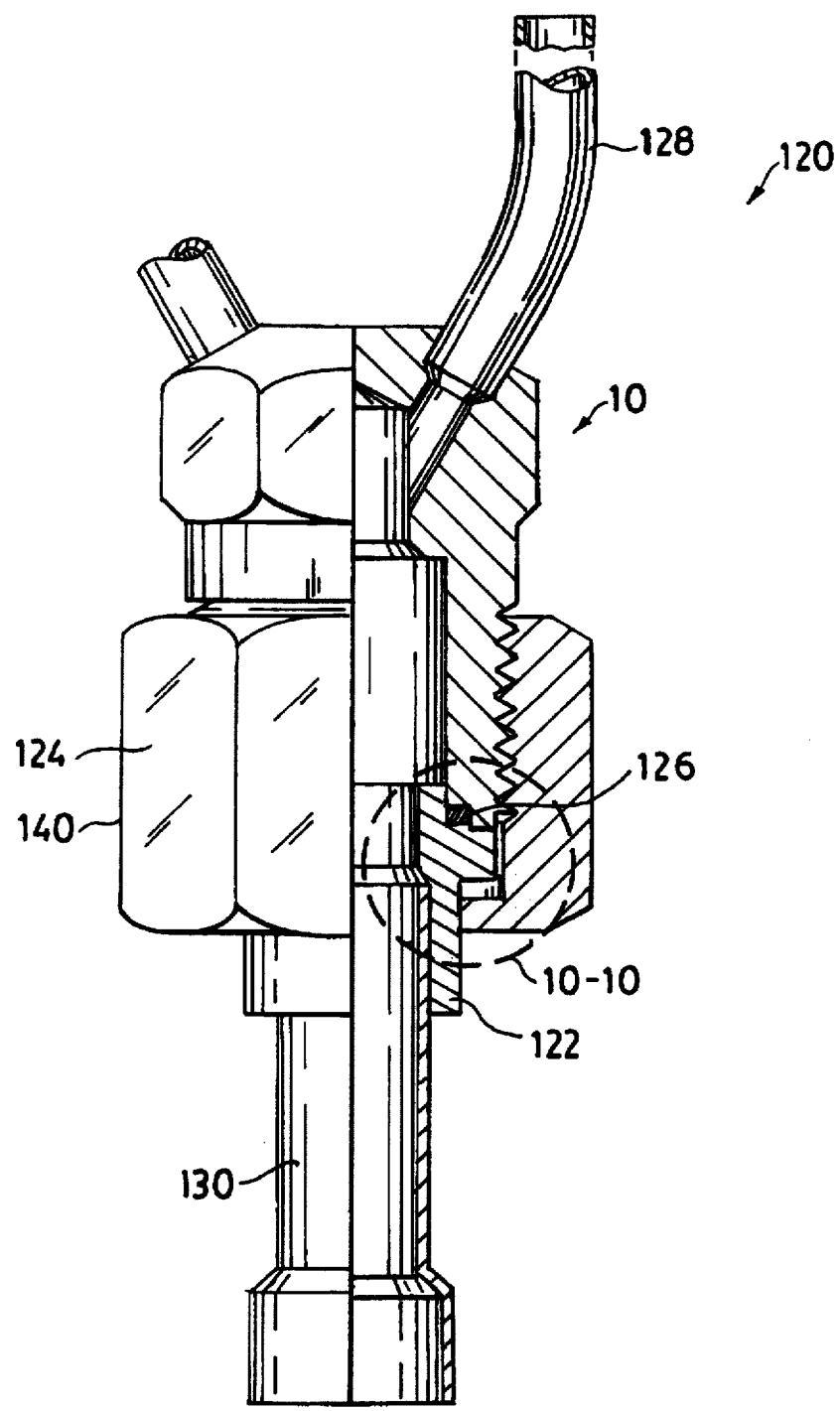
FIG. 9 is a sectional view of an bi-flow distributor valve of this invention.

FIG. 9 is a sectional view of a preferred reusable coupling 10. Referring to FIG. 9, it will be seen that reusable coupling 120 is comprised of body 10, adaptor 122, collar 124, and washer 126, which are used to connect one or more connector tube circuit tubes 128 to another fluid-containing device (not shown). Fluid may flow, or exit from, the valve 120 through connector tube 130.

Referring to FIGS. 9 and 10, and in the preferred embodiment depicted therein, it will be seen that the leading edge 132 of adaptor 122 preferably has a small inwardly facing lip 134. The structure of adaptor 122 is similar to that of adaptor 20 of U.S. Pat. No. 5,131,695.

Adaptor 122 is held to body 10 by collar 124, which has an inwardly facing flange ring 136 and one end and internal threads 138 at the opposite end. The radially outward surface 140 of collar 124 may be hexagonal or square or octagonal to accommodate manipulation with standard hand tools. Flange ring 136 engages collar retaining surface 142 of adaptor 122 and is rotatable with respect thereto while collar threads 138 engage body threads 28. As collar 124 is rotated, adaptor 122 is pulled into correct concentric alignment with body 10 and the leading edge 132 of adaptor 122 engages channel 62 of body 10. As collar 124 is rotated further the desired axial position of adaptor 122 with respect to body 10 can be achieved.

In one preferred embodiment, the adaptor, body, and collar may all be constructed of brass.

The body 10 has an interior configuration such that it forms a seal assembly similar to the seal assembly described in columns 3 and 4 of U.S. Pat. No. 5,131,695. Thus, referring to FIG. 2 of U.S. Pat. No. 5,131,695, the entire disclosure of which is hereby incorporated by reference into this specification, body 14 has an internal annular sealing groove 18 which is defined by body sealing surface 46 and body retention surface 48. Adaptor 20 includes external annular sealing groove 24 which is defined by adaptor sealing surface 50 and adaptor retention surface 52. Sealing surfaces 46 and 50 each lie in a plane generally perpendicular to the longitudinal axis 9 of the coupling and oppose each other in substantially parallel and spaced relationship. Body retention surface 48 is of cylindrical shape facing inwardly from the lower-most projection of the body structure, while adaptor retention surface 52 is cylindrical in shape facing outwardly from the uppermost portion of the adaptor structure. When leading end 26 of adaptor 20 is inserted into channel 16 of body 14, these four sealing and adaptor surfaces 46, 48, 50, and 52 form a washer seal cavity in which washer 30 is positioned and retained upon assembly. The cavity is generally annular in shape and may be substantially square or rectangular in cross section.

In the assembly of U.S. Pat. No. 5,131,695, the stop surface element of such assembly does not contact the adaptor until after the maximum intended compression of the washer has been exceeded. In the assembly of the instant application, by comparison, the stop surface contacts the adaptor substantially prior to the time the maximum intended compression of the washer has been exceeded.

In one preferred embodiment, a relatively "soft" washer is used together with suitable dimensions of the coupling body and the adaptor such that metal-to-metal contact occurs between the stop surface of the coupling body and the adaptor when the washer has been compressed no more than about 40 percent. Thus, e.g., in one embodiment, the washer in its uncompressed state has a width of 0.062 inches; and, when it is compressed to a width of not less than 0.038 inches, metal-to-metal contact occurs.

In one preferred embodiment, and referring to FIGS. 9 and 10, washer 126 is comprised of "Teflon". As is known to those skilled in the art, Teflon is a name for tetrafluoroethylene fluorocarbon polymers manufactured by the E.I. duPont deNemours & Company of Wilimington, Del.

These type of Teflon washers are well known to those skilled in the art and are described, e.g., in U.S. Pat. Nos. 5,282,640 and 5,131,695, the entire disclosures of which are hereby incorporated by reference into this specification.

As will be apparent to those skilled in the art, by appropriately choosing the a washer 126 with the correct thickness, and by utilizing washer cavities with the correct depths and lengths, a distributor valve assembly can be constructed which, under normal operating conditions, sees metal to metal contact. This condition is preferred in applicant's device.

The washer cavity typically has a depth 144 of from about 0.04 to about 0.08 inches (see FIG. 10) and a length 146 of from about 0.5 to about 0.75 inches.

Figure 11:
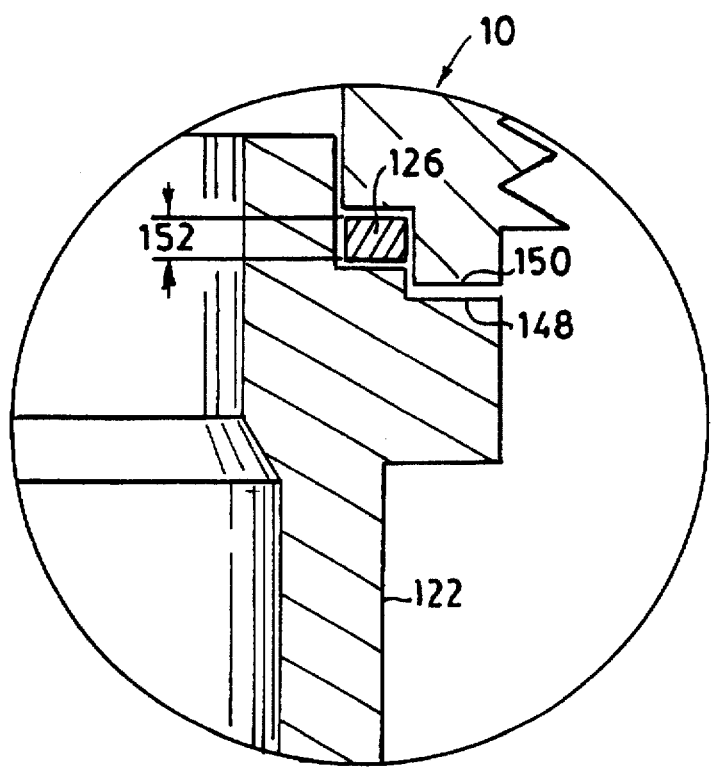
FIG. 11 is an enlarged sectional view of another portion of the valve of FIG. 9.

FIG. 11 is a partial sectional view of the valve of FIG. 9, illustrating how washer 126 is compressed between adaptor 122 and body 10. Referring to FIG. 11, it will be seen that, when metal-to-metal contact occurs between surfaces 148 and 150 of adaptor 122 and of body 10, respectively, the washer 126 is compressed only to a relatively minor extent. The original thickness 152 is compressed to lesser thickness (not shown) when such metal-to-metal contact occurs, which lesser thickness is preferably at least about 60 percent of original thickness 152. Thus, by way of illustration, when the original thickness 152 of washer 126 is 0.062 inches, the thickness of the compressed washer when surfaces 148 and 150 touch is at least about 0.038 inches.

A laminar bi-flow distributor body

Figure 13:
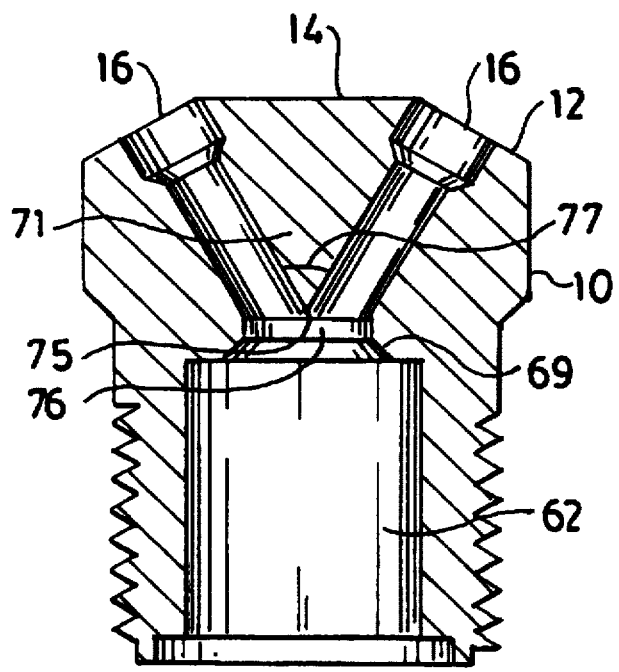
FIG. 13 is a sectional view of yet another preferred valve of the invention.

Another embodiment of applicant's invention is illustrated in FIGS. 12 and 13. The embodiment of these Figures is a connector assembly which comprises an integral connector body first end and a second end having a central channel and an internal annular sealing groove formed adjacent the second end, wherein said connector body is an integral structure comprised of a substantially hexagonal upper section comprised of a top portion and a bottom portion, a first, unthreaded cylindrical section joined to said top substantially hexagonal upper section, a second threaded cylindrical section joined to said first unthreaded cylindrical section, and a bottom, undercut, unthreaded section joined to said second threaded cylindrical section. The connector body has an overall length, as measured from said top of said substantially hexagonal upper section to the bottom of its undercut, unthreaded section, of from about 1.0 to about 1.4 inches. The substantially hexagonal upper section has a length of at least about 0.30 inches and a width of from about 0.60 to about 1.3 inches. The first unthreaded cylindrical section has a length of from about 0.1 to about 0.4 inches and a width of from about 0.62 to about 1.3 inches. The second threaded cylindrical section has a length of from about 0.25 to about 0.6 inches and a width which is substantially identical to the width of said first unthreaded cylindrical section. The bottom, undercut, unthreaded section has a length of less than about 0.08 inches and a width of from about 0.58 to about 1.22 inches.

The connector body illustrated in FIGS. 12 and 13 is comprised of a flow channel comprising a piston chamber communicating with a transition chamber. The piston chamber is defined by a top wall and a side wall and is disposed within and extends from the bottom of said second threaded cylindrical section. The piston chamber is disposed within said first unthreaded cylindrical section, said top wall of said piston chamber extending to a point intermediate the top and the bottom of said first unthreaded cylindrical section. The top wall of the said piston chamber is at least 0.03 inches below said bottom of said substantially hexagonal upper section, and is at least about 0.3 inches below the said top of said substantially hexagonal upper section. The side wall of said piston chamber has a width of at least about 0.13 inches.

The structure depicted in FIGS. 12 and 13 has a flow channel which communicates with a multiplicity of circuit holes which extend through said top portion of said connector body. The piston chamber terminates in a piston seat, wherein said piston seat is adjacent to said transition chamber. Disposed above the transition chamber is a divider structure which is integrally connected to said top portion of said connector body and which is formed by at least a first converging wall and a second converging wall intersecting at an apex point and forming an acute angle.

The first intersecting wall of said divider structure terminates in a first bottom surface, The second intersecting wall of said divider structure terminates in a second bottom surface, and each of said first bottom surface and said second bottom surface is disposed above at least a portion of each of said circuit holes.

The apparatus depicted in FIGS. 12 and 13 also is comprised of an adaptor having a central channel and an external annular sealing groove, said adaptor and external sealing groove being dimensioned relative to the connector body and internal sealing groove such that a portion of the adaptor and external groove are received within the central channel of the connector body, and the internal groove and the external groove mate to form a washer seal cavity. The apparatus also contains a washer disposed within the seal cavity for forming a sealed connection when the body and adaptor are engaged. The adaptor has an annular stop surface thereon, said stop surface positioned such that it contacts a portion of the connector body before the washer has exceeded its maximum intended compression.

The apparatus depicted in FIGS. 12 and 13 also contains means for movably connecting the connector body to the adaptor and selectively positioning the external sealing groove with respect to the internal sealing groove to thereby vary the compression of the washer within the variable seal cavity.

Referring to FIGS. 12 and 13, and in the preferred embodiments depicted therein, it will be seen that, in each of such embodiments, (1) a piston chamber 62 communicates with a piston seat 69 which, in turn, communicates with a transition chamber 76, and (2) a divider structure 71, which is integrally formed with the connector body, is disposed above the transition chamber 76, and is connected to the top portion of the connector body.

The divider structure 71 is formed by at least two converging walls. Sectional views of various embodiments of this divider structure are illustrated in FIGS. 14 et seq.

Figure 14:
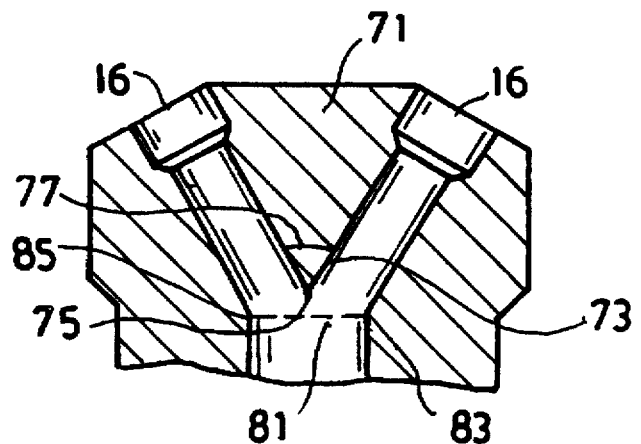
FIG. 14 is a partial sectional view of the valve of FIG. 12.

In the embodiment illustrated in FIG. 14, divider structure 71 is formed by continuous wall 73; it is in the shape of a cone. As is apparent to those skilled in the art, a cone is formed by an infinite number of walls and, thus, contains at least the first converging wall and the second converging wall called for by the claims of this case.

Referring again to FIG. 14, it will also be seen that each of the infinite number of walls 73 terminate in a common point 75. The converging walls 73, when they intersect, form an angle 77 which preferably is from about 45 to about 90 degrees.

Referring again to FIG. 14, it will be seen that point 75 is disposed above at least a portion of each of circuit holes. This can readily be seen by reference to the line 81 drawn from the bottom points 83 and 85 of the transition holes.

The embodiment of divider structure 71 is also illustrated in FIG. 12, which also shows a substantially conical divider section terminating in a point 75. This conical section may be machined into the connector body by conventional means.

The embodiment of FIG. 13, however, has a divider structure 71 which is formed by the intersection of two or more circuit holes. 16; and, as will be apparent to those skilled in the art, the divider structure 71 of this embodiment is formed by a finite number of walls.

Figure 15:
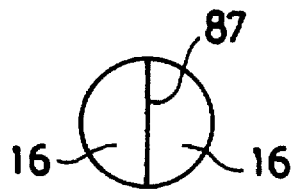
FIGS. 15, 16, and 17 and bottom views of a divider structure 71 used in the valve of FIG. 13 which is formed by two converging walls, three converging walls, or four converging walls, respectively.
Figure 16:
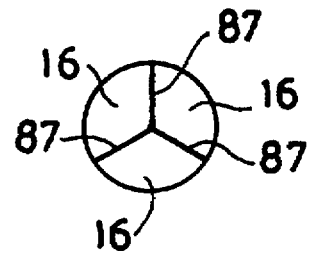
Figure 17:
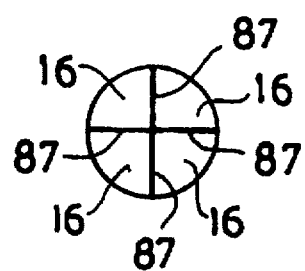

FIG. 15 is a bottom view of a divider 71 formed by two intersecting circuit holes 16; the divider 71 terminates in a knife edge 87. FIG. 16 is a bottom view of a divider 71 formed by three intersecting circuit holes 16; the divider 71 terminates in three knife edges 87. FIG. 17 is a bottom view of a divider 71 formed by four intersecting circuit holes 16; the divider 71 terminates in four knife edges 87. As will be apparent to those skilled in the art, one may form divider structure 71 with the intersection of from two to ten circuit holes 16.

In another embodiment, not shown, the divider structure 71 of this invention is used in connection with the reusable coupling disclosed and claimed in U.S. Pat. Nos. 5,131,695 and B1 5,131,695, the entire disclosures of which are hereby incorporated by reference into this specification. In this embodiment, as in the embodiments of FIGS. 12 and 13, the divider structure 71 is disposed above the transition chamber of the device of these patents and, furthermore, functions in substantially the same manner as the divider structure 71 of FIGS. 12 and 13.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A connector assembly comprising:
   (a) an integral connector body with a first end and a second end having a central channel and an internal annular sealing groove formed adjacent the second end, wherein:

1. said connector body is an integral structure comprised of a substantially hexagonal upper section comprised of a top portion and a bottom portion, a first, unthreaded cylindrical section joined to said top substantially hexagonal upper section, a second threaded cylindrical section joined to said first unthreaded cylindrical section, and a bottom, undercut, unthreaded section joined to said second threaded cylindrical section, wherein:
      (a) said connector body has an overall length, as measured from said top of said substantially hexagonal upper section to the bottom of its undercut, unthreaded section, of from about 1.0 to about 1.4 inches,
      (b) said substantially hexagonal upper section has a length of at least about 0.30 inches and a width of from about 0.60 to about 1.3 inches,
      (c) said first unthreaded cylindrical section has a length of from about 0.1 to about 0.4 inches and a width of from about 0.62 to about 1.3 inches,
      (d) said second threaded cylindrical section has a length of from about 0.25 to about 0.6 inches and a width which is substantially identical to the width of said first unthreaded cylindrical section,
      (e) said bottom, undercut, unthreaded section has a length of less than about 0.08 inches and a width of from about 0.58 to about 1.22 inches,
      (f) said connector body is comprised of a flow channel comprising a piston chamber communicating with a transition chamber, wherein:
         1. said piston chamber is defined by a top wall and a side wall and is disposed within and extends from the bottom of said second threaded cylindrical section,
         2. said piston chamber is disposed within said first unthreaded cylindrical section, said top wall of said piston chamber extending to a point intermediate the top and the bottom of said first unthreaded cylindrical section,
         3. said top wall of said piston chamber is at least 0.03 inches below said bottom of said substantially hexagonal upper section,
         4. said top wall of said piston chamber is at least about 0.3 inches below the said top of said substantially hexagonal upper section,
         5. said side wall of said piston chamber has a width of at least about 0.13 inches,
         6. said flow channel communicates with a multiplicity of circuit holes which extend through said top portion of said connector body,
         7. said piston chamber terminates in a piston seat, wherein said piston seat is adjacent to said transition chamber,
         8. disposed above said transition chamber is divider structure which is integrally connected to said top portion of said connector body and which is formed by at least a first converging wall and a second converging wall intersecting at an apex point and forming an acute angle, wherein:
            (a) said first intersecting wall terminates in a first bottom surface,
            (b) said second intersecting wall terminates in a second bottom surface, and
            (c) each of said first bottom surface and said second bottom surface is disposed above at least a portion of each of said circuit holes;
   (b) an adaptor having a central channel and an external annular sealing groove, said adaptor and external sealing groove being dimensioned relative to the connector body and internal sealing groove such that a portion of the adaptor and external groove are received within the central channel of the connector body, and the internal groove and the external groove mate to form a washer seal cavity, (c) a washer disposed within the seal cavity for forming a sealed connection when the body and adaptor are engaged;

(d) the adaptor having an annular stop surface thereon, said stop surface positioned such that it contacts a portion of the connector body before the washer has exceeded its maximum intended compression, (e) means for movably connecting the connector body to the adaptor and selectively positioning the external sealing groove with respect to the internal sealing groove to thereby vary the compression of the washer within the variable seal cavity, and (f) said integral connector body is comprised of a reverse cut off nib centrally disposed on the top portion of said substantially hexagonal upper section.

2. The connector assembly as recited in claim 1, wherein said reverse cut off nib has a substantially rectangular shape.

3. The connector assembly as recited in claim 1, wherein said reverse cut off nib has a substantially triangular shape.

4. The connector assembly as recited in claim 3, wherein said reverse cut off nib has a height of from about 0.03 to about 0.09 inches.

5. The connector assembly as recited in claim 4, wherein said reverse cut off nib has a width of from about 0.04 to about 0.2 inches.

6. A connector assembly comprising:
  (a) an integral connector body with a first end and a second end having a central channel and an internal annular sealing groove formed adjacent the second end, wherein:
    1. said connector body is an integral structure comprised of a substantially hexagonal upper section comprised of a top portion and a bottom portion, a first, unthreaded cylindrical section joined to said top substantially hexagonal upper section, a second threaded cylindrical section joined to said first unthreaded cylindrical section, and a bottom, undercut, unthreaded section joined to said second threaded cylindrical section, wherein:
      (a) said connector body has an overall length, as measured from said top of said substantially hexagonal upper section to the bottom of its undercut, unthreaded section, of from about 1.0 to about 1.4 inches,
      (b) said substantially hexagonal upper section has a length of at least about 0.30 inches and a width of from about 0.60 to about 1.3 inches,
      (c) said first unthreaded cylindrical section has a length of from about 0.1 to about 0.4 inches and a width of from about 0.62 to about 1.3 inches,
      (d) said second threaded cylindrical section has a length of from about 0.25 to about 0.6 inches and a width which is substantially identical to the width of said first unthreaded cylindrical section,
      (e) said bottom, undercut, unthreaded section has a length of less than about 0.08 inches and a width of from about 0.58 to about 1.22 inches,
      (f) said connector body is comprised of a flow channel comprising a piston chamber communicating with a transition chamber, wherein:
        1. said piston chamber is defined by a top wall and a side wall and is disposed within and extends from the bottom of said second threaded cylindrical section,
        2. said piston chamber is disposed within said first unthreaded cylindrical section, said top wall of said piston chamber extending to a point intermediate the top and the bottom of said first unthreaded cylindrical section,
        3. said top wall of said piston chamber is at least 0.03 inches below said bottom of said substantially hexagonal upper section,
        4. said top wall of said piston chamber is at least about 0.3 inches below the said top of said substantially hexagonal upper section,
        5. said side wall of said piston chamber has a width of at least about 0.13 inches,
        6. said flow channel communicates with a multiplicity of circuit holes which extend through said top portion of said connector body,
        7. said piston chamber terminates in a piston seat, wherein said piston seat is adjacent to said transition chamber,
        8. disposed above said transition chamber is divider structure which is integrally connected to said top portion of said connector body and which is formed by at least a first converging wall and a second converging wall intersecting at an apex point and forming an acute angle, wherein:
          (a) said first intersecting wall terminates in a first bottom surface,
          (b) said second intersecting wall terminates in a second bottom surface, and
          (c) each of said first bottom surface and said second bottom surface is disposed above at least a portion of each of said circuit holes;
  (b) an adaptor having a central channel and an external annular sealing groove, said adaptor and external sealing groove being dimensioned relative to the connector body and internal sealing groove such that a portion of the adaptor and external groove are received within the central channel of the connector body, and the internal groove and the external groove mate to form a washer seal cavity,
  (c) a washer disposed within the seal cavity for forming a sealed connection when the body and adaptor are engaged;
  (d) the adaptor having an annular stop surface thereon, said stop surface positioned such that it contacts a portion of the connector body before the washer has exceeded its maximum intended compression,
  (e) means for movably connecting the connector body to the adaptor and selectively positioning the external sealing groove with respect to the internal sealing groove to thereby vary the compression of the washer within the variable seal cavity, and
  (f) said body is comprised of a knife point extending within said washer seal cavity.

7. The connector assembly as recited in claim 6, wherein said knife point has a height of from about 0.01 to about 0.03 inches.

8. The connector assembly as recited in claim 7, wherein a movable piston is disposed within said piston chamber.

9. The connector assembly as recited in claim 8, wherein said movable piston is comprised of a central orifice extending through an annular body.

* * * * *